US012260398B2

(12) United States Patent
Alva et al.

(10) Patent No.: US 12,260,398 B2
(45) Date of Patent: Mar. 25, 2025

(54) ARTIFICIAL INTELLIGENCE CONTENT GENERATION CONTROL USING NON-FUNGIBLE TOKENS

(71) Applicant: eBay Inc., San Jose, CA (US)

(72) Inventors: Shobith Srinivas Alva, Bothell, WA (US); Andrew Chalkley, Milwaukie, OR (US); Ethan Benjamin Rubinson, San Jose, CA (US)

(73) Assignee: EBAY INC., San Jose, CA (US)

( * ) Notice: Subject to any disclaimer, the term of this patent is extended or adjusted under 35 U.S.C. 154(b) by 173 days.

(21) Appl. No.: 18/091,733

(22) Filed: Dec. 30, 2022

(65) Prior Publication Data

US 2024/0220966 A1    Jul. 4, 2024

(51) Int. Cl.
*G06Q 20/36* (2012.01)
*G06Q 20/40* (2012.01)

(52) U.S. Cl.
CPC ....... *G06Q 20/3672* (2013.01); *G06Q 20/401* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 11,244,032 B1 * | 2/2022 | Nguyen | ................. | G06F 9/547 |
| 11,461,774 B1 * | 10/2022 | Khan | .................... | H04L 9/3213 |
| 11,501,297 B1 * | 11/2022 | Tai | ........................ | G06Q 20/20 |
| 11,606,291 B2 * | 3/2023 | Simu | .................... | H04L 9/0643 |
| 11,743,544 B2 * | 8/2023 | McKenzie | ......... | H04N 21/4756 |
| | | | | 715/837 |
| 11,900,373 B2 * | 2/2024 | Tai | ......................... | G06Q 20/20 |
| 11,989,267 B2 * | 5/2024 | Wells | ....................... | H04L 9/50 |
| 11,991,078 B2 * | 5/2024 | Simu | ................... | G06Q 20/3674 |
| 2021/0357447 A1 * | 11/2021 | McKenzie | ............ | G11B 27/34 |
| 2021/0390263 A1 * | 12/2021 | Ricketts | ................ | G06F 40/166 |
| 2022/0058633 A1 * | 2/2022 | Yantis | ................ | G06Q 20/4016 |
| 2022/0229883 A1 * | 7/2022 | Khandelwal | ......... | G06Q 30/018 |
| 2022/0286491 A1 * | 9/2022 | White | ................ | H04N 21/4126 |

(Continued)

FOREIGN PATENT DOCUMENTS

| | | | | |
|---|---|---|---|---|
| WO | WO-2022204208 A1 * | 9/2022 | ............. | G06F 21/10 |
| WO | WO-2023050012 A1 * | 4/2023 | ......... | G06F 16/9024 |

OTHER PUBLICATIONS

Starryai. "How to Create an NFT." (Jan. 6, 2022). Retrieved online Sep. 16, 2024. https://creator.nightcafe.studio/create-nft-art (Year: 2022).*

(Continued)

*Primary Examiner* — James A Reagan
(74) *Attorney, Agent, or Firm* — Shook Hardy & Bacon LLC (57) ABSTRACT

Generation of digital content by an artificial intelligence (AI) generator is controlled through the use of non-fungible tokens (NFTs) for prompts to the AI generator. When a request is received for the AI generator to generate digital content using a prompt as input, ownership of an NFT for the prompt is verified. If ownership is verified, the prompt is provided as input to the AI generator to generate digital content. However, if ownership is not verified, the prompt is not provided as input to the AI generator, thereby preventing the AI generator from generating digital content using the prompt.

20 Claims, 8 Drawing Sheets

(56) References Cited

U.S. PATENT DOCUMENTS

| | | | |
|---|---|---|---|
| 2022/0293107 A1* | 9/2022 | Leaman | G06F 16/951 |
| 2022/0309131 A1* | 9/2022 | Nguyen | H04L 9/0618 |
| 2022/0343250 A1* | 10/2022 | Tremblay | G06Q 10/0633 |
| 2022/0351193 A1* | 11/2022 | Quigley | G06Q 20/065 |
| 2022/0351195 A1* | 11/2022 | Quigley | H04L 9/50 |
| 2022/0366061 A1* | 11/2022 | Spivack | H04L 9/3271 |
| 2023/0073859 A1* | 3/2023 | Matthews | G06Q 30/0641 |
| 2023/0075767 A1* | 3/2023 | Bradley | G06Q 30/0234 |
| 2023/0093031 A1* | 3/2023 | Sharda | G07F 17/3251 705/39 |
| 2023/0108983 A1* | 4/2023 | Vosseller | G06Q 20/38215 705/76 |
| 2023/0109574 A1* | 4/2023 | Vosseller | G06F 21/64 705/317 |
| 2023/0120476 A1* | 4/2023 | Baskin | G06Q 20/3672 705/66 |
| 2023/0177878 A1* | 6/2023 | Sekar | G06F 40/40 382/103 |
| 2023/0196353 A1* | 6/2023 | Jakobsson | G06Q 20/3829 705/39 |
| 2023/0274287 A1* | 8/2023 | Blaikie, III | H04L 9/3239 705/50 |
| 2023/0289784 A1* | 9/2023 | Khan | G06Q 20/367 |
| 2023/0347257 A1* | 11/2023 | Jordan | G06Q 40/04 |
| 2023/0385445 A1* | 11/2023 | Saavedra | G16H 40/67 |
| 2023/0388122 A1* | 11/2023 | Saavedra | H04L 9/3213 |
| 2024/0070234 A1* | 2/2024 | Wells | H04L 9/3213 |

OTHER PUBLICATIONS

Mason Marcobello. "What Are Generative Art NFTs?" (Oct. 25, 2022). Retrieved online Sep. 16, 2024. https://www.coindesk.com/learn/what-are-generative-art-nfts/ (Year: 2022).*

Clarisco. "NFT Development Platform END-END Solution Company." (Dec. 4, 2021). Retrieved online Sep. 16, 2024. https://www.clarisco.com/nft-development-services-solutions (Year: 2021).*

Arikan et al., "Qualitative Study of Text-to-Image AI Generators and their Relationship with NFTs", 2022 International Conference on Computational Science and Computational Intelligence. 2022. pp. 240-245.

EP Communication received for European Application No. 23216247.9, mailed on Jul. 8, 2024, 2 pages.

European search report received for European Application No. 23216247.9, mailed on May 22, 2024, 8 pages.

Office action received for Australian Patent Application No. 2023282241, mailed on Dec. 3, 2024, 4 pages.

* cited by examiner

ARTIFICIAL INTELLIGENCE CONTENT GENERATION CONTROL USING NON-FUNGIBLE TOKENS

BACKGROUND

An artificial intelligent (AI) generator is a software program or system that uses artificial intelligence/machine learning techniques to automatically generate digital content (e.g., text, audio, images, videos) based on input provided by a user or system. The input provided to an AI generator is known as a prompt, and it can take various forms (text, audio, images, videos) depending on the design of the AI generator and/or the type of digital content being generated.

For example, an AI generator that produces written content may use a prompt in the form of a few sentences or a paragraph that provides information about the topic being written about. An AI generator that generates images may use a prompt in the form of a description of the image being generated or a sample image that serves as a reference. Similarly, an AI generator that generates audio may use a prompt in the form of a script or set of instructions for the audio being generated.

SUMMARY

Some aspects of the present technology relate to, among other things, employing non-fungible tokens (NFTs) for prompts to control generation of digital content by AI generators. In accordance with some aspects, an NFT is minted for a prompt. The NFT includes the prompt or a pointer to a separate storage location for the prompt. The NFT is also associated with a blockchain account to identify ownership of the NFT. After minting an NFT for a prompt, a request is received for the AI generator to generate digital content using the prompt. In some cases, the request identifies the prompt. In other cases, the request identifies the NFT for the prompt. In either event, ownership of the NFT by the requestor is verified (e.g., based on a private key of the blockchain account). If ownership of the NFT is verified, the prompt is provided as input to the AI generator, which generates digital content based on the prompt. The digital content can then be provided to the requestor. If ownership of the NFT is not verified, the prompt is not provided as input to the AI generator, thereby preventing the AI generator from generating digital content using the prompt. In some configurations, a message is provided to the requestor indicating that use of the prompt is not authorized.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

AI generators provide the ability to create endless amounts of digital content. However, there is currently no reliable and efficient solution for controlling the digital content created by AI generators. Anybody who has access to an AI generator can enter in any prompt they wish to have digital content created. While an AI generator can be re-designed/re-trained to control the digital content generated, this is time-consuming and resource-intensive, particularly for large and complex models.

Aspects of the technology described herein improve the functioning of the computer itself in light of these shortcomings in existing technologies by providing a system that controls generation of digital content by AI generators using non-fungible tokens for prompts to the AI generators. In accordance with some aspects, a service controls minting of NFTs for prompts and verifying authorization to use prompts for the generation of digital content based on ownership of the NFTs.

In some aspects, the service receives a prompt and determines that an NFT has not been generated for the prompt. For instance, the service could receive a prompt entered by a user and query a data store listing prompts for which NFTs have been minted and/or query a blockchain to determine if an NFT has been minted for the prompt. The service generates a request to mint an NFT with information for creating the NFT, including the prompt and a blockchain account ID for the user requesting the prompt. In some embodiments, the request can include further information for controlling use of the prompt, such as an identification of an AI generator for which the prompt can be used and/or one or more use conditions, such as a number of uses of the prompt or a time period with which the prompt can be used. A blockchain system mints an NFT for the prompt in response to the request. The NFT includes the prompt or a pointer to a separate storage location for the prompt. Additionally, the NFT is associated with the blockchain account ID to reflect ownership of the NFT. In some instances, the NFT could also include AI generator ID(s) and/or use condition(s) specified in the request to mint the NFT.

After the NFT has been minted for the prompt, the service receives a request to use the prompt for generation of digital content by an AI generator. The request could identify the prompt or the NFT for the prompt. In response to the request, the service verifies ownership of the NFT by the requestor. This can include, for instance, sending a request to the blockchain system to verify ownership of the NFT of the prompt, which can include the requestor digitally signing using a private key of the requestor's blockchain account. In configurations in which the NFT is associated with a particular AI generator, verification that the prompt is to be used with that AI generator is also performed. In configurations in which the NFT is associated with one or more use conditions, verification that the one or more conditions have been satisfied is also performed.

If the service determines that use of the prompt is verified, the prompt is provided as input to the AI generator, which generates digital content using the prompt. The digital content can then be provided to the client device of the requestor. If the service determines that use of the prompt is not verified, the service prevents the prompt from being provided to the AI generator, thereby preventing the AI generator from generating digital content using the prompt. In some aspects, a message is provided to the requestor to indicate that use of the prompt is not authorized.

As used herein, a "prompt" refers to any seed (e.g., a seed phrase) used by an AI generator to generate an output. A prompt can include text, images, audio, and/or video input to the AI generator. A prompt can also include additional parameters and variables (e.g., parameters/variables in addition to a text/image/audio/video input). A prompt could further include data related to model training (e.g., hyperparameters, temperature settings, etc.). In some aspects, the prompt can be encrypted and decryptable only by a private key. In this way, the prompt is the "secret" that helps generate digital content via the AI generator, and the access to the secret is controlled through the private key such that the private-key holder has exclusive access.

Aspects of the technology described herein provide a number of improvements over existing technologies. For instance, the technology prevents unauthorized generation of digital content by an AI generator. In this way, aspects of the technology provide a digital rights management (DRM) system for AI generators that was previously unavailable. By use of the technologies described herein, NFTs on a blockchain securely maintain prompts. Because the NFTs are stored on a blockchain, the prompts and ownership of the prompts are protected from unauthorized modification. Additionally, for increased transparency, code for minting the NFTs and verifying ownership and use conditions can be included in data blocks of the blockchain. Further, the NFTs and blockchain system provide for transparency and traceability of transactions involving ownership and/or use of the prompts.

Example System for AI Content Generation Using NFTs

Figure 1A:
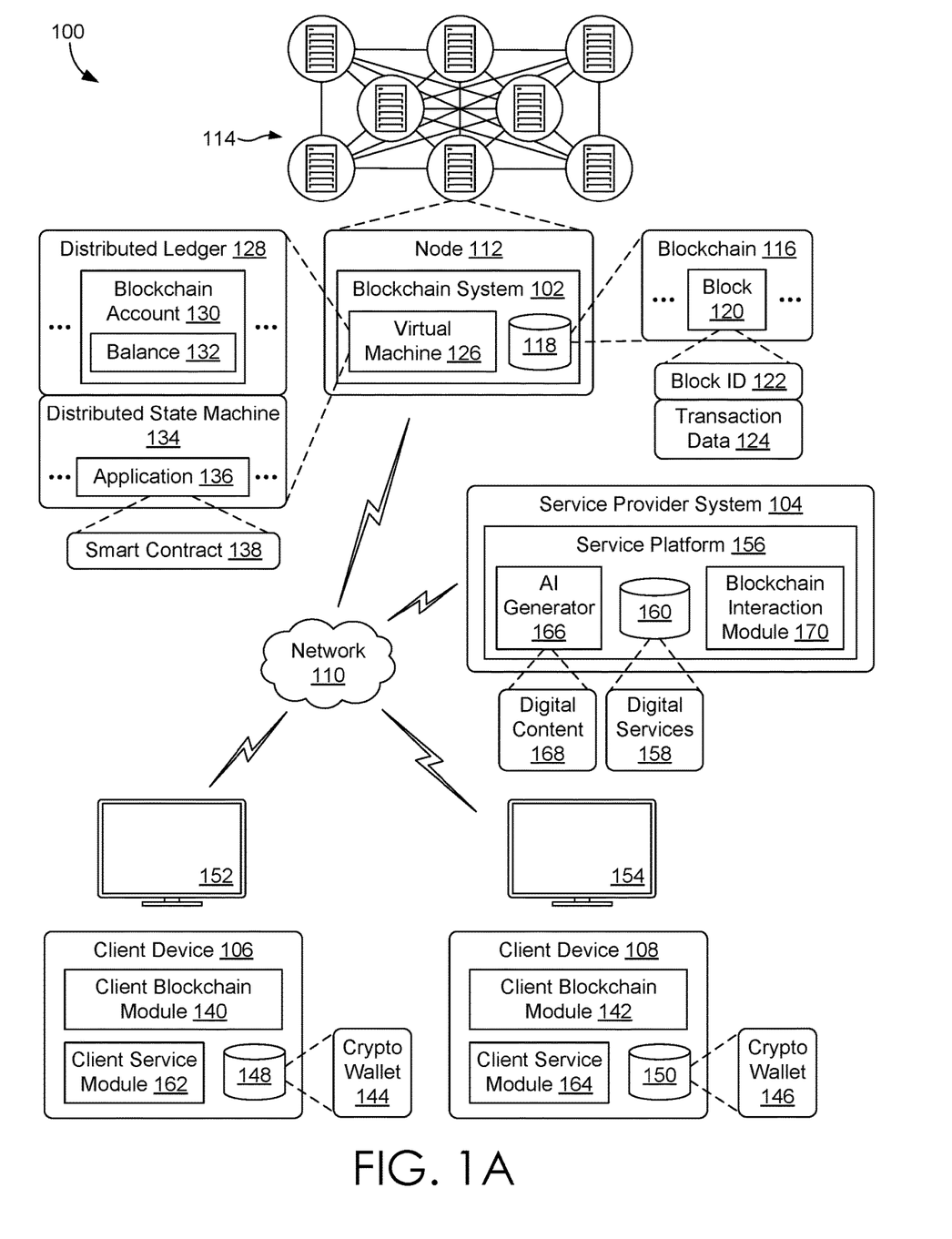
FIG. 1A is a block diagram illustrating an exemplary system in accordance with some implementations of the present disclosure.

FIG. 1A is an illustration of a blockchain environment 100 in an example implementation that is operable to employ techniques described herein. The blockchain environment 100 includes a blockchain system 102, a service provider system 104, and a plurality of client devices (represented as client devices 106, . . . , 108) that are communicatively coupled, one to another, via a network 110.

Computing devices that implement the blockchain environment 100 are configurable in a variety of ways. A computing device, for instance, is configurable as a desktop computer, a laptop computer, a mobile device (e.g., assuming a handheld configuration such as a tablet or mobile phone), IoT device, a wearable device, AR/VR device, a server, and so forth. Thus, a computing device ranges from full resource devices with substantial memory and processor resources to low-resource devices with limited memory and/or processing resources. By way of example, each computing can comprise a device such as the computing device 700 of FIG. 7, discussed below. Additionally, although in instances in the following discussion reference is made to a computing device in the singular, a computing device is also representative of a plurality of different devices, such as multiple servers of a server farm utilized to perform operations in a distributed, networked environment.

The blockchain system 102 is implemented by a plurality of nodes 112. Nodes 112 are a runtime implemented using processing, memory, and network resources of respective computing devices 114 that operate as the infrastructure of a blockchain 116. As part of this, the nodes 112 store, communicate, process, and manage data that makes up the blockchain 116. Nodes 112 are interconnected as illustrated in FIG. 1A to exchange data via the network 110, e.g., as a peer-to-peer network in a distributed and decentralized manner.

The blockchain 116 is formed using a plurality of blocks 120, illustrated in FIG. 1A as including respective block identifiers (IDs) 122 and transaction data 124. Transaction data 124 of the blocks 120 includes, for instance, batches of validated transactions that are hashed and encoded. Each block 120 includes a cryptographic hash of a prior block 120 in the blockchain 116, thereby linking the blocks 120 to each other to form the blockchain 116. As a result, the blocks 120 cannot be altered retroactively without altering each subsequent block 120 in the blockchain 116 and in this way protects against attacks by malicious parties.

In order to generate the blocks 120 for addition to the blockchain 116, a node 112 is implemented as a "miner" to add a block of transactions to the blockchain 116. The other nodes 112 of the blockchain system 102 check if the block of transactions is valid, and based on this, determine whether to accept or reject this data. If valid, the block of transactions is stored as transaction data 124 along with a block ID 122 for a respective block 120, e.g., is stored "at the end" or "at the top" of the blockchain 116 along with a hash of a previous block in the chain. The nodes 112 broadcast this transaction history via the network 110 for sharing with other nodes 112. This acts to synchronize the blocks 120 of the blockchain 116 across the distributed architecture of the blockchain system 102. Other types of nodes 112 can also be included as part of the blockchain system 102. In one such example, full nodes are nodes that store an entirety of the blockchain 116, e.g., locally in computer-readable storage media of a respective storage device 118. Other types of nodes are also employed to implement additional functionality, for instance, to govern voting events, execution of protocol operations, rules enforcement, and so forth.

In some aspects, the blockchain system 102 implements a virtual machine 126 that is representative of a diverse range of functionality made possible by leveraging the blockchain 116. In a first such example, the virtual machine 126 implements a distributed ledger 128 of blockchain accounts 130 and associated balances 132 of those blockchain accounts 130. The distributed ledger 128 supports secure transfer of digital assets (e.g., tokens or coins of cryptocurrencies) between blockchain accounts 130 without management by a central authority through storage as part of the transaction data 124 of the blockchain 116. Through synchronized and distributed access supported by the blockchain 116 as described above, changes to balances 132 (e.g., a number of tokens) are visible to any entity with access to the blockchain 116. Techniques are also implemented to support management of the balances 132 across the blockchain accounts 130, e.g., to enforce rules that a respective blockchain account 130 does not transfer more coins than are available based on a balance 132 specified for that blockchain account 130.

In another example, the virtual machine 126 implements a distributed state machine 134 that supports execution of applications 136, which can reside within blocks 120 of the blockchain 116. The distributed state machine 134 is implemented along with the transaction data 124 within the blocks 120 of the blockchain 116 such that the blocks 120 describe accounts and balances as described above for the distributed ledger 128. The transaction data 124 also supports a machine state, which can change from block to block of the blockchain 116. In one example, an application 136 is executable as part of a "Turing-complete" decentralized virtual machine that is distributed across the nodes 112 of the blockchain system 102. As Turning-complete, the application 136 is computationally universal to perform computing device operations, e.g., logic or computing functions. Thus, the application 136 is executable by a processing system of a computing device as software that is storable in a computer-readable storage media of the nodes 112 to perform a variety of operations.

An example of an application 136 that is executable as part of the distributed state machine 134 is a smart contract 138. A smart contract 138 is executable automatically and without user intervention (or with partial human interaction as inputs when desired) by the nodes 112 of the distributed state machine 134. Execution of the smart contract 138 includes obtaining data from a specified data source (e.g., devices, APIs, and so forth that are accessible via the network 110), and based on this data, initiating one or more operations based on conditions described in the smart contract 138. In one example, the smart contract 138 is a type of blockchain account 130 that includes a balance 132 and initiates transactions based on conditions specified by the smart contract 138, e.g., to support automated escrow and other functionalities. A variety of other examples are also contemplated that support implementation of any executable operation by a computing device using software.

Cryptocurrencies (e.g., coins of the cryptocurrency) are the native asset of the blockchain 116, and tokens are created "on top" of these. In an example of a token, the smart contracts 138 implement non-fungible tokens (NFTs). NFTs include digital assets that are provably unique and as such cannot be duplicated or divided. As such, NFTs are not exchanged as having a same value as coins in cryptocurrency, but rather are digital assets having identifying information recorded as part of the smart contract 138. This identifying information is immutably recorded on that token's blockchain 116 and thus ownership of the token is also recorded and tracked. A variety of information is storable as part of the digital content represented by an NFT, examples of which include digital images, digital media, digital content, executable instructions of an application 136 as described above, secure file links, in-game tokens, digital artwork, and so forth. Other examples of tokens are also contemplated that are fungible and as such are interchangeable with each other.

The client devices 106, 108 include respective client blockchain modules 140, 142 that are representative of functionality of the client devices 106, 108 to interact with the blockchain system 102. An example of this functionality includes management of respective crypto wallets 144, 146, e.g., in local storage devices 148, 150. The crypto wallets 144, 146 store public and private cryptographic keys in this example that are used to support interaction with the blockchain system 102, and more particularly respective blockchain accounts 130 of the blockchain system 102, using respective user interfaces 152, 154.

A public key supports transactions to an address of a corresponding blockchain account 130 derived from the public key, which are stored as part of the blockchain 116 to memorialize the transactions as part of transaction data 124. In one example, an address of a blockchain account 130 is generated by generating a private key, e.g., using a randomization technique, deriving a corresponding public key from the private key, and deriving the address of the blockchain account 130 from the public key, e.g., as an entirety of the public key or as a shortened version of the public key. The private key is used to "unlock" transactions that are "locked" by the public key and gain access to the blockchain account 130, e.g., access to coins, tokens or other information maintained as part of the transactions.

In one example, a transaction is initiated by the client device 106 with client device 108. Data of the transaction is encrypted using a public key. The transaction is then signed by client device 108 using the private key which indicates that the transaction has not been modified, e.g., by encrypting the data being sent in the transaction using the private key. The transaction is then verifiable as authentic by using the public key included with the data. The nodes 112 use the accompanying public key to automatically verify authenticity that the transaction is signed using the private key. Transactions that fail authentication are rejected by the nodes 112. Authentic transactions are used as part of transaction data 124 in minting blocks 120 by the nodes 112 that are added to the blockchain 116, e.g., as part of the distributed ledger 128. In this way, the virtual machine 126 of the blockchain system 102 supports a variety of functionality through use of the distributed ledger 128, distributed state machine 134, and/or other blockchain and cryptographic functionality.

The blockchain environment 100 also includes a service provider system 104 implementing a service platform 156 of digital services 158 (illustrated as maintained in a storage device 160) that are executable via a processing system. The digital services 158 involve electronic delivery of data and implementation of data functionality by computing devices to support a range of computing device operations. The digital services 158, for instance, involve interactions with client devices, such as the client devices 106, 108, to control the generation of digital content 168 by an artificial intelligence (AI) generator 166 for presentation of the digital content 168 on the client devices. The digital services 158 are also implemented to facilitate interactions with client devices (such as the client devices 106, 108) for the generation, management, transfer, and verification of NFTs for prompts to the AI generator 166.

The AI generator 166 comprises any type of machine learning model that takes a prompt as input and generates digital content 168 from the prompt. The AI generator 166 can be based on any number of different architectures. For instance, the AI generator 166 could be based on a generative adversarial network (GAN), a diffusion model, or a variational autoencoder. Examples of existing AI generators include the DALL-E 2, Imagen, Stable Diffusion, and ChatGPT AI generators. The AI generator 166 could be, for instance, a text generator that generates text (e.g., articles, stories, etc.) based on a prompt; an image generator that generates an image (e.g., creates original image or manipulates existing image) based on a prompt; an audio generator that generates audio (e.g., creates original audio clip or manipulates existing audio clip) based on a prompt; or a video generator that generates video (e.g., creates original video or manipulates existing video) based on a prompt. Depending on the design of the AI generator 166, the prompt could be text-based, image-based, audio-based, and/or video-based data, as well as any other parameters, variables, and/or data related to model training (e.g., hyperparameters, temperature settings, etc.).

While the AI generator 166 is shown as a component of the service provider system 104 in the embodiment of FIG. 1A, it should be understood that in other embodiments, the AI generator 166 is separate from the service provider system 104. In some configurations, the service provider system 104 can include and/or interact with multiple AI generators. For instance, the service provider system 104 could control processing of prompts by different AI generators, which could be provided by entities separate from an entity providing the service provider system 104.

Figure 1B:
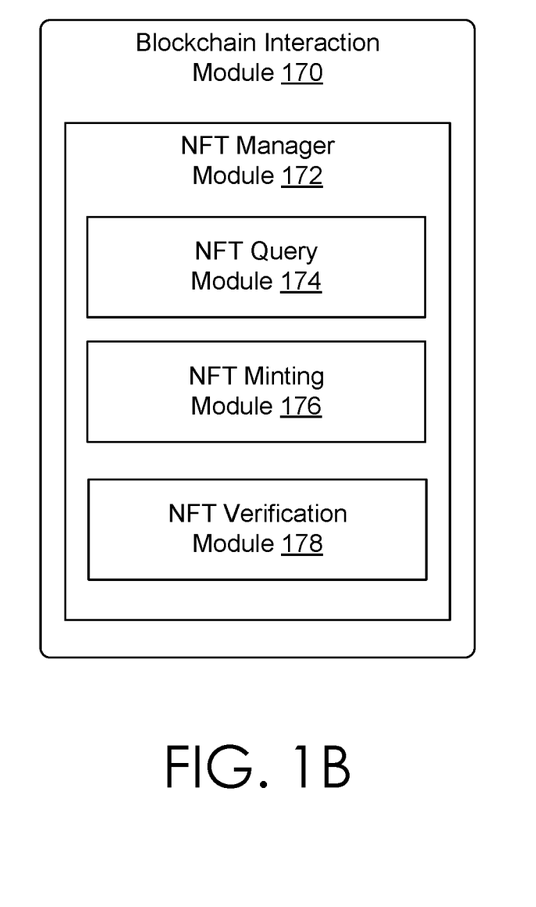
FIG. 1B is a block diagram illustrating a blockchain interaction module for interacting with the blockchain system of FIG. 1A in accordance with some implementations of the present disclosure.

The service provider system 104 further includes a blockchain interaction module 170 to access functionality made available via the blockchain system 102. As shown in FIG. 1B, among other things, the blockchain interaction module 170 includes functionality represented by an NFT manager module 172 to manage NFT interactions, including the generation, management, transfer, and verification of NFTs on the blockchain 116 of the blockchain system 102. As shown in FIG. 1B, the NFT manager module 172 includes an NFT query module 174, an NFT minting module 176, and an NFT verification module 178.

The NFT query module 174 is configured to determine whether an NFT has been generated on the blockchain 116 for a given prompt. For instance, the service provider system 104 could receive a prompt from a client device, such as the client device 106, for either the generation of a NFT for the prompt or for the generation of digital content using the prompt. In some configurations, a data store maintains a list of prompts for which NFTs have been generated on the blockchain 116, and the NFT query module 174 performs a lookup on the data store to determine if the prompt is included in the list. In some instances, the data store also identifies an NFT (e.g., using an NFT ID) associated with each prompt. In some configurations, the NFT query module 174 queries the blockchain 116 and/or associated metadata to determine if an NFT for the prompt exists on the blockchain 116.

The NFT minting module 176 is configured to cause generation of an NFT for a given prompt. For example, if a user of the client device 106 submits a prompt to the service provider system 104 and the NFT query module 174 determines that an NFT has not been minted for the prompt, the service provider system 104 could provide a message to the client device 106 to determine if the user wishes to have an NFT minted for the prompt (e.g., based on a certain cost, which could be paid for using a cryptocurrency). The NFT minting module 176 generates a request to have an NFT minted for the prompt and submits the request to the blockchain system 102. When the NFT has been generated, the blockchain system 102 can provide an indication of the NFT to the service provider system 104, which in turn provides a notice of the NFT to the client device 106. In some aspects, the prompt is encrypted (e.g., using a public key associated with the client device 106) when minting the NFT. An example providing additional details of minting an NFT for a prompt is provided below with reference to FIG. 2.

The NFT verification module 178 verifies authorization to have a prompt provided as input to the AI generator 166 to generate digital content based on the prompt. For example, a user could submit a request for the AI generator 166 to generate the digital content 168 for a given prompt. The request could specify the prompt itself or the NFT for the prompt. The NFT verification module 178 verifies ownership of the NFT for the prompt by the user submitting the request. Verification of ownership could involve, for instance, the user providing a digital signature using a private key (e.g., stored in crypto wallet 144 or offline in "cold storage"). In some configurations, additional verification beyond ownership is also performed. For instance, an NFT for a prompt could be tied to a particular AI generator (or subset of AI generators) in the case of the system 100 including multiple AI generators. Verification could be performed to determine the NFT for the prompt allows use of the prompt for the particular AI generator 166 being used. In some configurations, one or more conditions of use of the prompt are associated with an NFT. These conditions could restrict use of the prompt based on, for instance, number of uses, time of use, requesting device geolocation, requesting device ID, or type of requesting device. In such configurations, verification is performed to determine that any condition(s) associated with an NFT are satisfied. An example providing additional details of verifying use of a prompt based on an NFT is provided below with reference to FIG. 3.

If the verification process determines that use of the prompt is not authorized, the service provider system 104 prevents the prompt from being provided as input to the AI generator 166. In some instances, a message can also be provided to the requesting client device indicating that use of the prompt is not authorized. If the verification process determines that use of the prompt is authorized, the service provider system 104 provides the prompt to the AI generator 166, which generates the digital content 168 based on the prompt, and the digital content is provided to the requesting client device. In configurations in which the prompt is encrypted when minting the NFT, the verification process and/or use of the prompt can comprise decrypting the prompt (e.g., using a private key of the client device 106).

Functionality of the client devices 106, 108 to access the digital services 158 of the service provider system 104 is represented by respective client service modules 162, 164. The client service modules 162, 164, are configurable as browser, network-enabled applications, third-party plugins, and so on to access the digital services 158 via the network 110.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Figure 2:
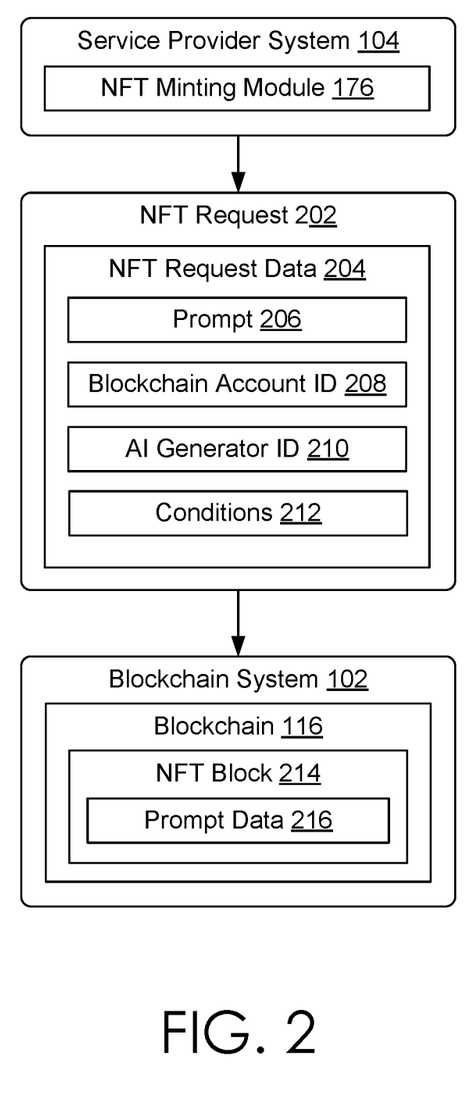
FIG. 2 is a block diagram illustrating an example of generating a non-fungible token for a prompt to an artificial intelligence generator in accordance with some implementations of the present disclosure.

Turning next to FIG. 2, a block diagram is provided showing generation of an NFT for a prompt in accordance with some aspects of the technology described herein. As shown in FIG. 2, the NFT minting module 176 generates an NFT request 202. In some configurations, the NFT minting module 176 generates the NFT request 202 in response to user input. For example, the service provider system 104 could receive a prompt from a client device, such as the client device 106.

In some aspects, the NFT query module 174 determines that an NFT for the received prompt has not been generated prior to generating the NFT request 202 and/or submitting the NFT request 202 to the blockchain system 102 for minting an NFT for the prompt. For instance, the NFT query module 174 could query a data store identifying prompts for which NFTs have been generated to determine the received prompt is not listed in the data store. Alternatively, the NFT query module 174 could query the blockchain 116 to determine there is currently no NFT on the blockchain 116 for the received prompt.

The NFT minting module 176 generates NFT request data 204 for the NFT request 202. In the example of FIG. 2, the NFT request data 204 includes the prompt 208, a blockchain account ID 208, an AI generator ID 210, and conditions 212. It should be understood that the data elements of the NFT request data 204 shown in FIG. 2 is provided by way of example only and not limitation. In various configurations, some data elements shown can be omitted while other data elements not shown can be included. Additionally, although the NFT request data 204 is shown as part of a single NFT request 202, in some embodiments, the NFT request data 204 can be transmitted via multiple communications.

The prompt 208 in the NFT request data 202 corresponds with the prompt received by the service provider system 104. In various embodiments, the prompt 208 could be, for instance, text-based, image-based, audio-based, and/or video-based data depending on the type of input the AI generator is able to process, as well as any other parameters, variables, and/or data related to model training (e.g., hyperparameters, temperature settings, etc.).

The blockchain account ID 208 identifies a blockchain account (e.g., blockchain account 130) to associate with the NFT for the prompt when minted. In some cases, the blockchain account ID 208 comprises an address of a blockchain account (e.g., an address comprising or derived from a public key). For instance, the blockchain account ID 208 could be communicated to the service provider system 104 from a client device (e.g., client device 106) in conjunction with receiving the prompt from the client device.

Some configurations support generating NFTs for prompts to multiple AI generators. In such configurations, each AI generator is assigned an AI generator ID for identifying the AI generator. As such, the NFT request data 204 in the example of FIG. 2 includes an AI generator ID 210 that identifies the AI generator for which the prompt is intended as input. In some cases, a prompt can be associated with multiple AI generators, and the request data 204 can include the AI generator ID for each of the AI generators. In this way, a prompt can be associated with a single AI generator (in the case in which the NFT request data 204 includes a single AI generator ID) or multiple AI generators (in the case in which the NFT request data 204 includes multiple AI generator IDs).

The conditions 212 in the NFT request data 202 specify one or more conditions associated with use of the prompt as input to the AI generator. For instance, the conditions 212 could specify a number of times the prompt can be used as input to the AI generator, a time limit for which the prompt can be used as input to the AI generator, a geolocation with which a request for use of the prompt is valid, and/or an identification of a device or device type for which a request for use of the prompt is valid. It should be understood that these conditions are provided by way of example only and not limitation as other types of conditions that impact use of the prompt as input to the AI generator could be employed.

The NFT request 202 generated by the NFT minting module 176 is communicated to the blockchain system 102, which initiates an NFT minting process based on the NFT request data 204 in the NFT request 202. For instance, the blockchain system 102 could include a smart contract (e.g., smart contract 138) that comprises code for generating NFTs. In such configurations, the blockchain system 102 executes the code of the smart contract in response to receiving the NFT request 202. As shown in FIG. 2, an NFT block 214 is generated and linked to the blockchain 116. Among other things, the NFT block 214 includes prompt data 216. In some configurations, the prompt data 216 comprises the prompt 206. In other configurations, the prompt 206 is stored off-chain in a separate storage system (e.g., the InterPlanetary File System), and the prompt data 216 comprises a pointer to the storage location for the prompt 206. In some aspects, the prompt is encrypted (e.g., using a public key associated with blockchain account ID 208) when minting the NFT. Although not shown in FIG. 2, the NFT block 214 could further include the blockchain account ID 208, the AI generator ID 210, and/or the conditions 212. Alternatively, some or all of this data could be stored in a separate block on the blockchain 116.

Figure 3:
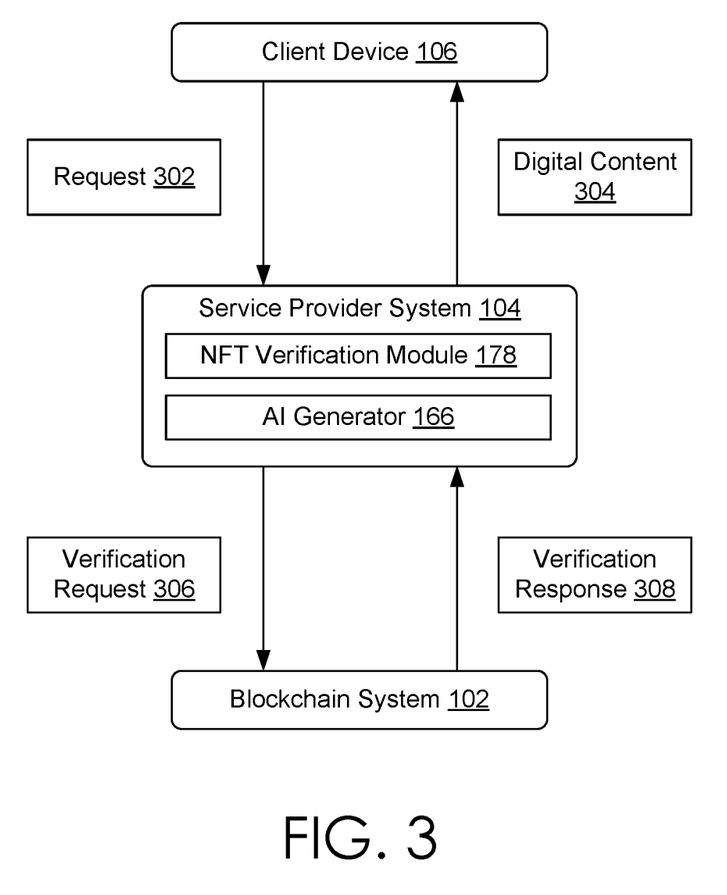
FIG. 3 is a block diagram illustrating an example of verifying authorization to use a prompt associated with an NFT for input to an artificial intelligence generator to generate digital content based on the prompt in accordance with some implementations of the present disclosure.

FIG. 3 provides a block diagram showing an example of using an NFT of a prompt for content generation by an AI generator. As shown in FIG. 3, a client device 106 submits a request 302 to the service provider system 104. In some embodiments, the request 302 identifies a prompt for input to the AI generator 166. For instance, the request 302 could include text-based, image-based, audio-based, and/or video-based data for input to the AI generator 166 for generating digital content, as well as any other parameters, variables, and/or data related to model training (e.g., hyperparameters, temperature settings, etc.). In other embodiments, the request 302 does not identify the prompt but instead identifies an NFT for the prompt. For instance, the request 302 could include an NFT ID or other block ID for identifying the NFT on the blockchain 116 of the blockchain system 102.

Based on the request 302 received at the service provider system 104, the NFT verification module 178 verifies authorization to use the prompt associated with the request 302 (e.g., a prompt included in the request 302 or a prompt associated with an NFT identified by the request 302). In the example of FIG. 3, the NFT verification module 178 sends a verification request 306 to the blockchain system. In some aspects, the verification request 306 identifies an NFT based on the prompt or the NFT included in the request 302. In instances in which the request 302 includes a prompt without identifying an NFT, the NFT query module 174 could identify an NFT for the prompt. For instance, the NFT query module 174 could perform a lookup on a data store mapping prompts to NFTs or the NFT query module 174 could query the blockchain system 102 for the prompt.

The blockchain system 102 verifies whether the prompt is authorized for use as input to the AI generator 166. For instance, an application implemented by the blockchain system 102 (e.g. application 136) could be configured to perform a verification process. Among other things, the blockchain system 102 verifies ownership of the NFT for the prompt in response to the verification request 306. Verification could be performed in a number of different ways within the scope of embodiments of the present disclosure. In some aspects, verification is performed using a private key (e.g., stored in the crypto wallet 144 of the client device 106 or offline in "cold storage"). For instance, the user of the client device 106 could be requested to digitally sign a message using the private key to verify ownership of the NFT.

In some embodiments, the blockchain system 102 also verifies authorization to use the prompt based on the AI generator 166 and/or any conditions associated with the NFT. For instance, the NFT could specify one or more AI generators for which the prompt is authorized for use. In such instances, the verification request 306 could include an AI generator ID for the AI generator 166, and the blockchain system 102 could verify that the AI generator ID included in the verification request 306 corresponds with an AI generator ID associated with the NFT. In some cases, the NFT could specify one or more conditions (e.g., number of users, time of use, geolocation, device, etc.), and the blockchain system 102 verifies whether the conditions have been satisfied.

A verification response 308 is returned to the service provider system 104. In some instances, the verification response 308 could indicate an unsuccessful verification. In such instances, the prompt would not be provided to the AI generator 166, and a message could be returned to the client device 106 indicating that use of the prompt is not authorized. In other instances, the verification response 308 could indicate successful verification. The verification response 308 could also include the prompt. For instance, in cases in which the request 302 identified an NFT without identifying a prompt, the blockchain system 102 identifies the prompt (either from the NFT itself or from a storage location identified by the NFT) and provides the prompt with the verification response 308. In configurations in which the prompt is encrypted when minting the NFT, the verification process and/or use of the prompt can comprise decrypting the prompt (e.g., using a private key of the client device 106). Based on a successful verification, the prompt is provided as input to the AI generator 166, which generates digital content 304 based on the prompt, and the digital content 304 is provided to the client device 106

Example Methods for AI Content Generation Using NFTs

Figure 4:
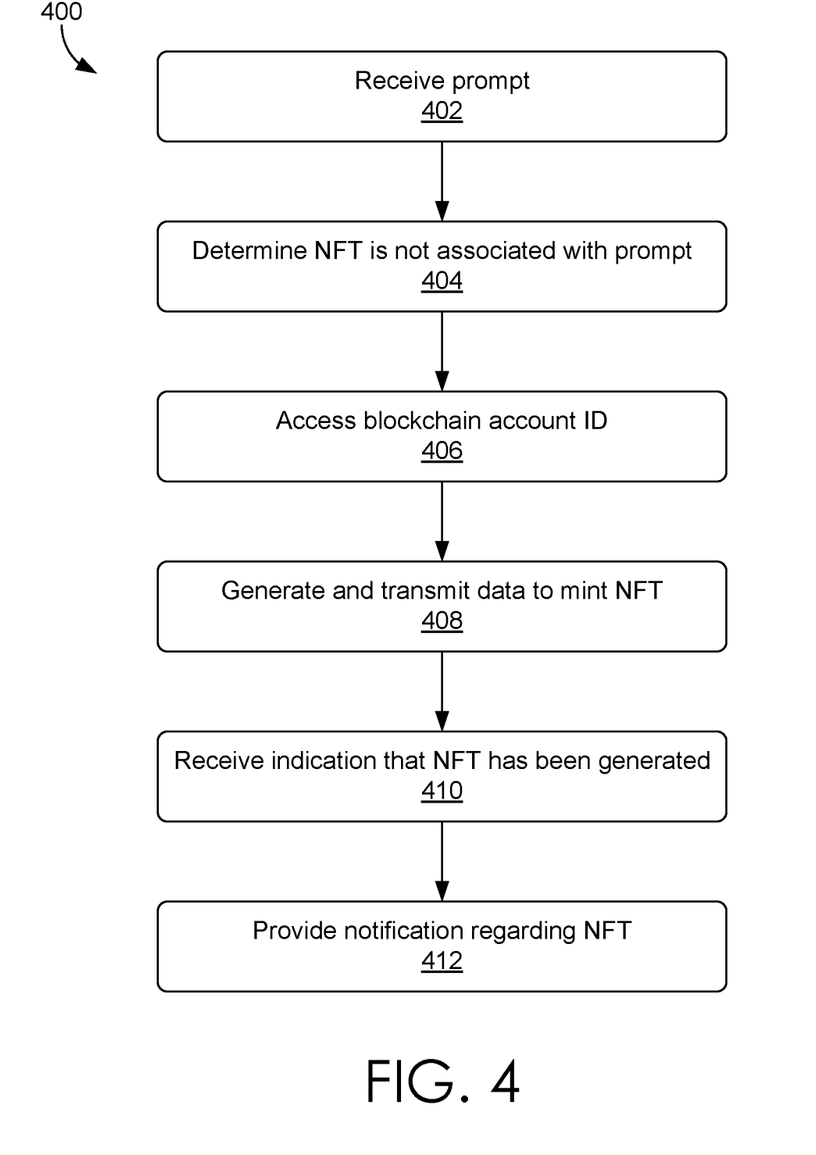
FIG. 4 is a flow diagram showing a method for generating an NFT for a prompt to an artificial intelligence generator in accordance with some implementations of the present disclosure.

With reference now to FIG. 4, a flow diagram is provided that illustrates a method 400 for generating an NFT for a prompt to an AI generator. The method 400 can be performed, for instance, by the service provider system 104 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, a prompt is received. The prompt could comprise, for instance, text-based, image-based, audio-based, and/or video-based data that can be provided as input to an AI generator, as well as any other parameters, variables, and/or data related to model training (e.g., hyperparameters, temperature settings, etc.). A determination is made at block 404 that an NFT on a blockchain is not currently associated with the prompt. This could be performed, for instance, by querying a data store maintaining a list of prompts for which NFTs have been generated and/or by querying the blockchain.

A blockchain account ID for a blockchain account of the requestor submitting the prompt is accessed, as shown at block 406. A request to mint an NFT for the prompt is generated and transmitted to the blockchain system, as shown at block 408. The request can include a variety of data, including, for instance, the prompt, the blockchain account ID, an AI generator ID, and/or one or more conditions for use of the prompt.

The blockchain system generates the NFT for the prompt in response to the request, and an indication that the NFT has been generated for the prompt is returned, as shown at block 410. A notification regarding the NFT for the prompt is provided to the requestor, as shown at block 412.

Figure 5:
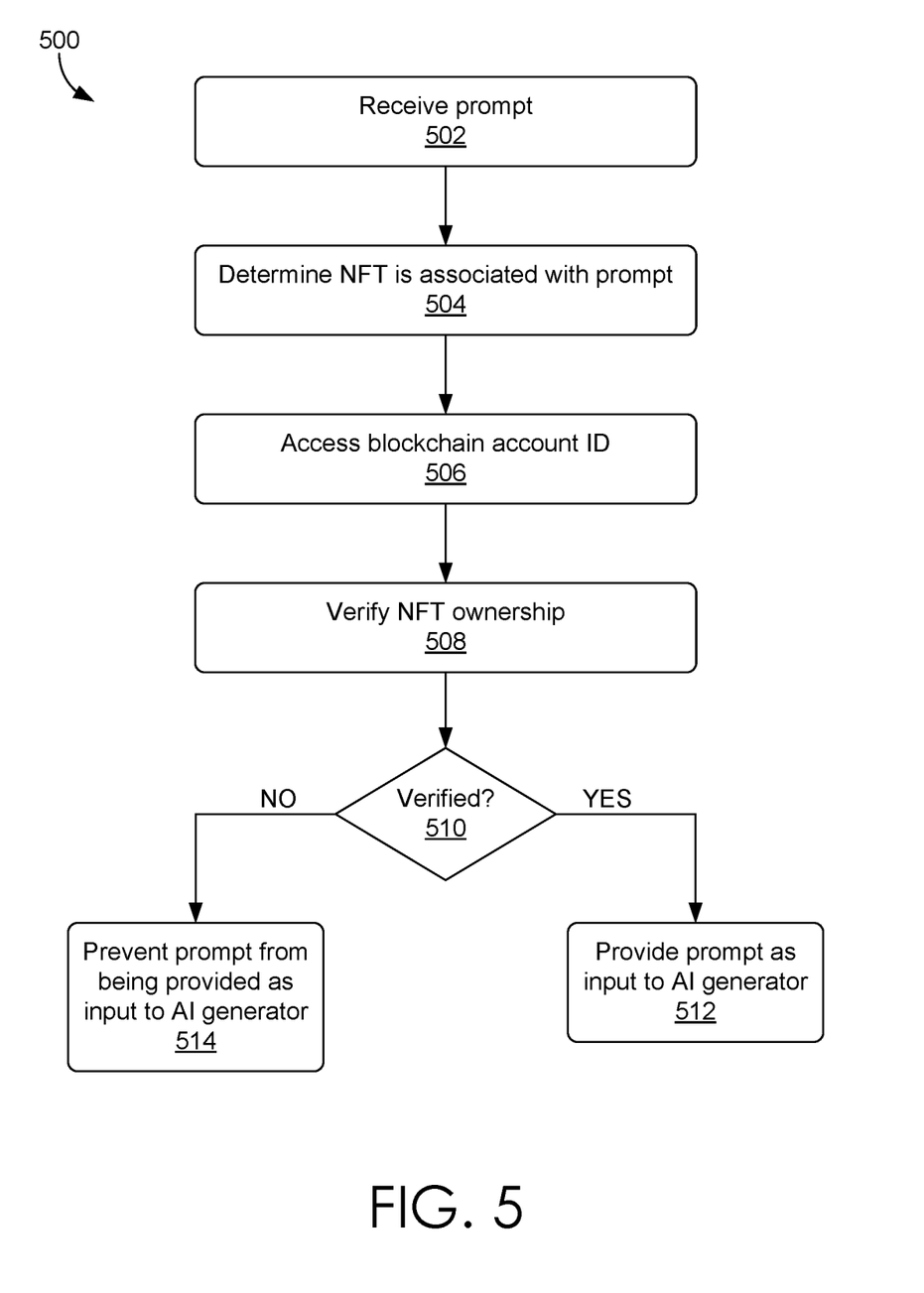
FIG. 5 is a flow diagram showing a method for receiving a prompt and verifying authorization to use the prompt as input to an artificial intelligence generator to generate digital content in accordance with some implementations of the present disclosure.

FIG. 5 is a flow diagram showing a method 500 for receiving a prompt and verifying authorization to use the prompt as input to an AI generator to generate digital content. The method 500 can be performed, for instance, by the service provider system 104 of FIG. 1. As shown at block 502, a prompt is received. A determination is made that an NFT has been minted on the blockchain for the prompt, as shown at block 504. This could be performed, for instance, by querying a data store maintaining a list of prompts for which NFTs have been generated and/or by querying the blockchain.

A blockchain account ID for a blockchain account of the requestor submitting the prompt is accessed, as shown at block 506. Ownership of the NFT by the blockchain account identified by the blockchain account ID is verified, as shown at block 508. In some aspects, ownership verification is performed by submitting a verification request to the blockchain system, which verifies the requestor owns the NFT, for instance, based on a private key of the blockchain account. In some configurations, the blockchain system performs additional verifications based on any AI generators and/or use conditions identified by the NFT.

A determination is made at block 510 regarding whether use of the NFT is verified (e.g., based on a response from the NFT system). As shown at block 512, if verified, the prompt is provided as input to the AI generator, which generates digital content using the prompt, and the digital content can be provided to the client device of the requestor. As shown at block 514, if not verified, the prompt is not provided as input to the AI generator. In some instances, a message is provided to the client device of the requestor indicating that use of the prompt is not authorized.

Figure 6:
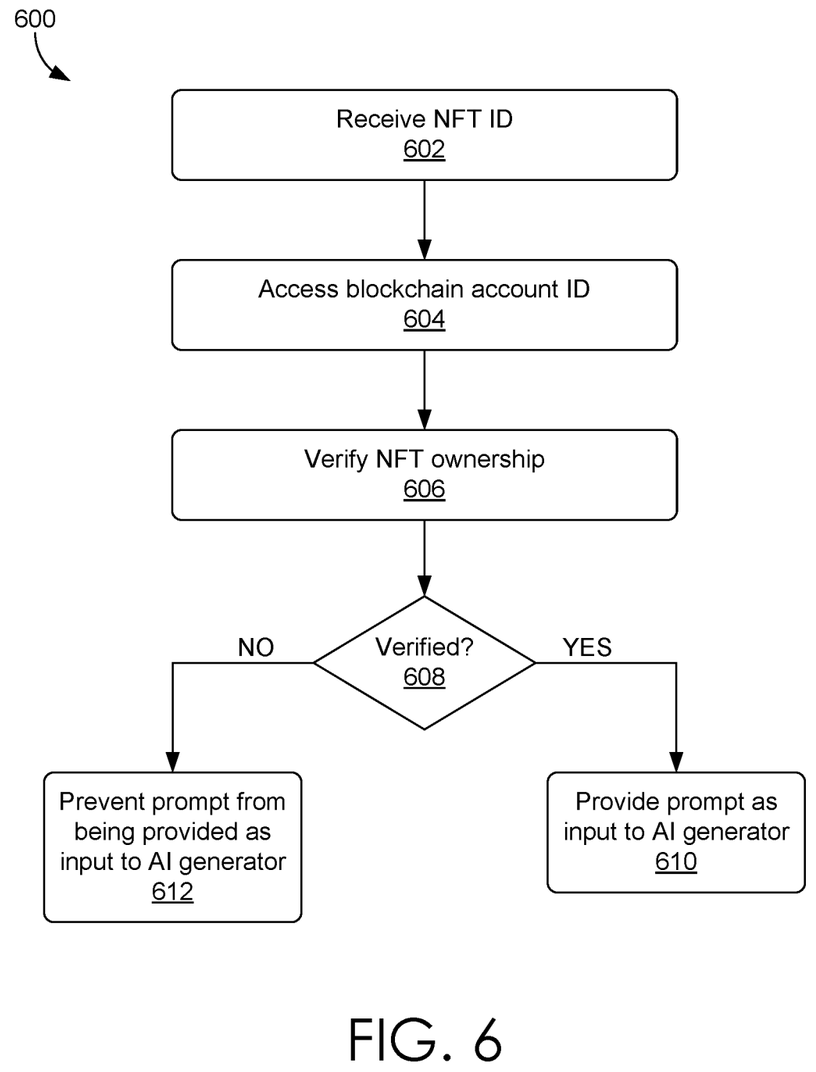
FIG. 6 is a flow diagram showing a method for receiving an NFT associated with a prompt and verifying authorization to use the prompt as input to an artificial intelligence generator to generate digital content in accordance with some implementations of the present disclosure.

FIG. 6 is a flow diagram showing a method 600 for receiving an NFT associated with a prompt and verifying authorization to use the prompt as input to an AI generator to generate digital content. The method 600 can be performed, for instance, by the service provider system 104 of FIG. 1. As shown at block 602, data identifying an NFT is received. A blockchain account ID for a blockchain account of the requestor submitting the NFT is accessed, as shown at block 604. Ownership of the NFT by the blockchain account identified by the blockchain account ID is verified, as shown at block 606. In some aspects, ownership verification is performed by submitting a verification request to the blockchain system, which verifies the requestor owns the NFT, for instance, based on a private key of the blockchain account. In some configurations, the blockchain system performs additional verifications based on any AI generators and/or use conditions identified by the NFT.

A determination is made at block 608 regarding whether use of the NFT is verified (e.g., based on a response from the NFT system). As shown at block 610, if verified, the prompt is provided as input to the AI generator, which generates digital content using the prompt, and the digital content can be provided to the client device of the requestor. As shown at block 612, if not verified, the prompt is not provided as input to the AI generator. In some instances, a message is provided to the client device of the requestor indicating that use of the prompt is not authorized.

Exemplary Operating Environment

Figure 7:
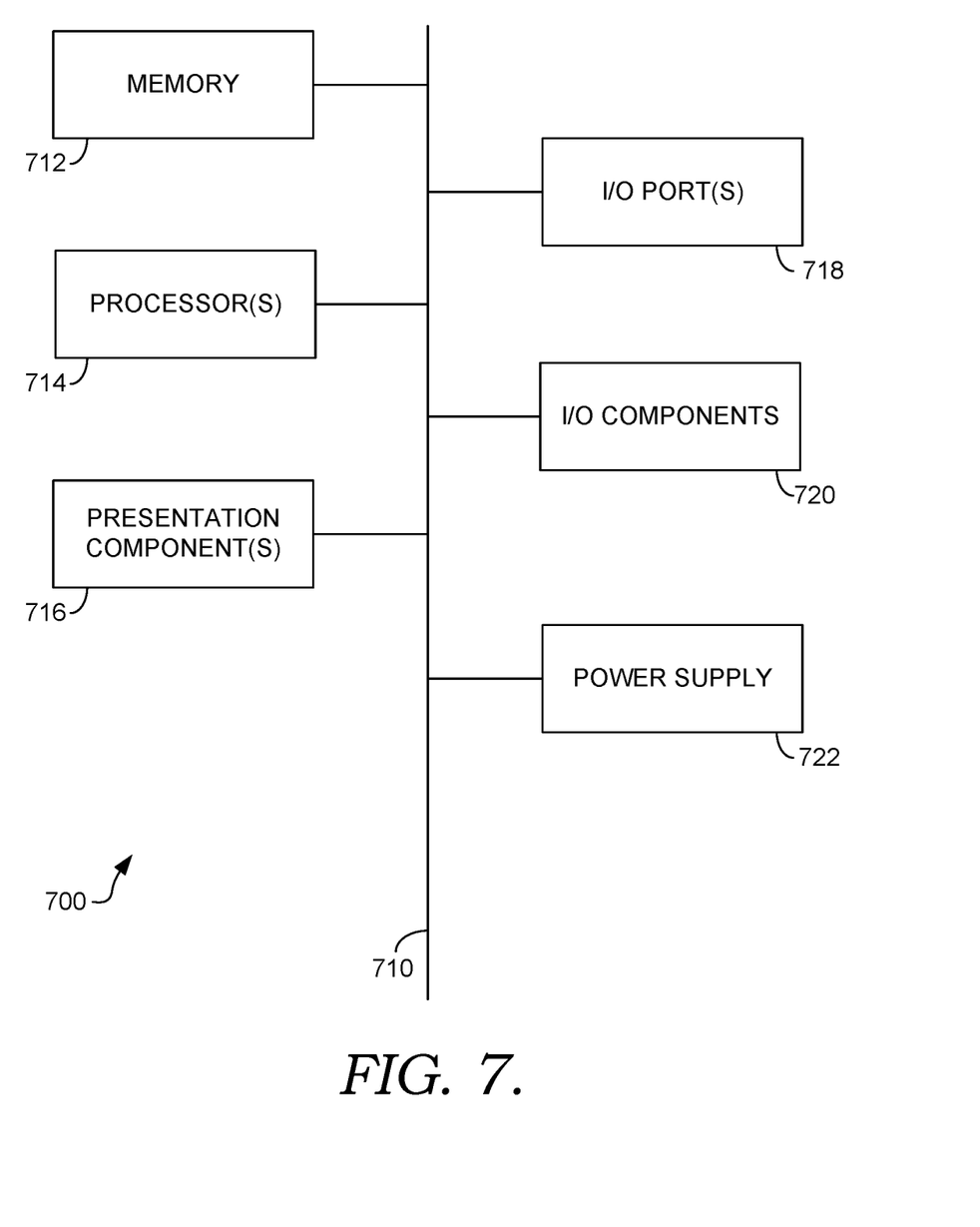
FIG. 7 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 7 in particular, an exemplary operating environment for implementing embodiments of the present technology is shown and designated generally as computing device 700. Computing device 700 is but one example of a suitable computing environment and is not intended to suggest any limitation as to the scope of use or functionality of the technology. Neither should the computing device 700 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what can be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory can be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which can be built in. Illustrative components include a microphone, joystick, game pad, satellite dish, scanner, printer, wireless device, etc. The I/O components 720 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 can be equipped with depth cameras, such as, stereoscopic camera systems, infrared camera systems, RGB camera systems, and combinations of these for gesture detection and recognition. Additionally, the computing device 700 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. A computer-implemented method comprising:
receiving an input prompt for input to an artificial intelligence (AI) generator, the input prompt matching a prompt that has been minted as a non-fungible token (NFT) on a blockchain;
receiving data identifying a blockchain account;
verifying whether the blockchain account owns the NFT; and
controlling input of the input prompt to the AI generator based on whether the blockchain account owns the NFT.

2. The computer-implemented method of claim 1, wherein the method further comprises:
performing a lookup on a data store identifying a plurality of prompts for which corresponding NFTs have been minted on the blockchain to identify the input prompt as matching the prompt that has been minted as the NFT.

3. The computer-implemented method of claim 1, wherein the input prompt comprises one or more selected from the following: text, an image, a video, and audio.

4. The computer-implemented method of claim 1, wherein the AI generator is configured to generate digital content based on the input prompt, the digital content comprising one or more selected from the following: text, an image, a video, and audio.

5. The computer-implemented method of claim 1, wherein the method further comprises:
verifying whether the NFT is associated with the AI generator; and
wherein input of the input prompt to the AI generator is further controlled based on whether the NFT is associated with the AI generator.

6. The computer-implemented method of claim 1, wherein the method further comprises:
verifying whether one or more conditions associated with the NFT have been satisfied; and
wherein input of the input prompt to the AI generator is further controlled based on whether the one or more conditions have been satisfied.

7. The computer-implemented method of claim 1, wherein verifying whether the blockchain account owns the NFT is based at least in part on a private key associated with the blockchain account.

8. The computer-implemented method of claim 1, wherein controlling input of the input prompt to the AI generator comprises:
providing the input prompt as input to the AI generator responsive to verifying the blockchain account owns the NFT.

9. The computer-implemented method of claim 1, wherein controlling input of the input prompt to the AI generator comprises:

preventing the input prompt from being provided as input to the AI generator responsive to not verifying the blockchain account owns the NFT.

10. One or more computer storage media storing computer-useable instructions that, when used by a computing device, cause the computing device to perform operations, the operations comprising:
   receiving data identifying a non-fungible token (NFT) on a blockchain and a blockchain account, the NFT having been minted for a prompt;
   verifying that the blockchain account owns the NFT;
   responsive to verifying the blockchain account owns the NFT, accessing the prompt minted as the NFT; and
   providing the prompt to an artificial intelligence (AI) generator, causing the AI generator to generate digital content using the prompt.

11. The one or more computer storage media of claim 10, wherein the prompt comprises one or more selected from the following: text, an image, a video, and audio.

12. The one or more computer storage media of claim 10, wherein the digital content generated by the AI generator comprises one or more selected from the following: text, an image, a video, and audio.

13. The one or more computer storage media of claim 10, wherein the operations further comprise:
   verifying that the NFT is associated with the AI generator; and
   wherein the prompt is provided to the AI generator based on verifying that the NFT is associated with the AI generator.

14. The one or more computer storage media of claim 10, wherein the operations further comprise:
   verifying that one or more conditions associated with the NFT have been satisfied; and
   wherein the prompt is provided to the AI generator based on verifying that the one or more conditions have been satisfied.

15. The one or more computer storage media of claim 10, wherein verifying that the blockchain account owns the NFT is based at least in part on a private key associated with the blockchain account.

16. A computer system comprising:
   one or more processors; and
   one or more computer storage media storing computer-useable instructions that, when used by one or more processors, cause the one or more processors to perform operations, the operations comprising:
   receiving a prompt for input to an artificial intelligence (AI) generator;
   determining the prompt has not been minted as a non-fungible token (NFT) on a blockchain; and
   causing generation of a NFT on the blockchain by minting the prompt as the NFT.

17. The computer system of claim 16, wherein determining the prompt has not been minted as an NFT on the blockchain comprises querying a data store identifying a plurality of prompts for which an NFT has been minted on the blockchain.

18. The computer system of claim 16, wherein determining the prompt has not been minted as an NFT on the blockchain comprises querying the blockchain for the prompt.

19. The computer system of claim 16, wherein causing generation of the NFT on the blockchain comprises generating a request, the request including data identifying the prompt and a blockchain account.

20. The computer system of claim 19, wherein the request further includes data identifying the AI generator and one or more conditions for use of the prompt as input to the AI generator.

* * * * *